(12) United States Patent
Salinger

(10) Patent No.: US 10,652,095 B2
(45) Date of Patent: May 12, 2020

(54) DYNAMIC ASSIGNMENT OF SIGNALS TO PORTS IN AN ACCESS PLATFORM

(71) Applicant: Comcast Cable Communications, LLC, Philadelphia, PA (US)

(72) Inventor: Jorge Salinger, West Palm Beach, FL (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 228 days.

(21) Appl. No.: 15/049,973

(22) Filed: Feb. 22, 2016

(65) Prior Publication Data

US 2016/0315820 A1 Oct. 27, 2016

Related U.S. Application Data

(63) Continuation of application No. 12/843,960, filed on Jul. 27, 2010, now Pat. No. 9,307,304.

(60) Provisional application No. 61/333,684, filed on May 11, 2010.

(51) Int. Cl.
| | |
|---|---|
| *H04L 12/28* | (2006.01) |
| *H04L 12/24* | (2006.01) |
| *H04Q 11/00* | (2006.01) |
| *H04L 12/26* | (2006.01) |
| *H04L 12/911* | (2013.01) |
| *H04L 29/08* | (2006.01) |

(52) U.S. Cl.
CPC ............. *H04L 41/12* (2013.01); *H04L 43/16* (2013.01); *H04L 47/70* (2013.01); *H04L 67/306* (2013.01); *H04Q 11/0067* (2013.01); *H04Q 2011/0064* (2013.01); *H04Q 2011/0079* (2013.01)

(58) Field of Classification Search
CPC ......... H04L 41/12; H04L 43/16; H04L 47/70; H04L 45/02; H04Q 11/0067
See application file for complete search history.

(56) References Cited

U.S. PATENT DOCUMENTS

| | | | | |
|---|---|---|---|---|
| 6,359,879 | B1 * | 3/2002 | Carvey | H04L 45/04 370/351 |
| 7,471,639 | B1 * | 12/2008 | Bauer | H04H 20/33 348/384.1 |
| 8,416,702 | B2 | 4/2013 | Hoshi | |
| 2003/0035472 | A1 * | 2/2003 | Mouton | H04L 5/20 375/222 |
| 2004/0090970 | A1 * | 5/2004 | Sanchez | H04L 12/18 370/397 |
| 2004/0109449 | A1 * | 6/2004 | Seo | H04B 7/18584 370/390 |
| 2004/0109499 | A1 * | 6/2004 | Cern | H04B 3/54 375/222 |

(Continued)

OTHER PUBLICATIONS

CA Office Action—CA Application 2724920—dated Feb. 13, 2017.

(Continued)

*Primary Examiner* — Gerald A Smarth

(74) *Attorney, Agent, or Firm* — Banner & Witcoff, Ltd.

(57) ABSTRACT

Signals may be forwarded to a variety of ports for transmission. The signals may be modulated for transmission. The forwarding of signals to ports may be accomplished by forwarding the signals to one or more signal modulators using a processing unit. The mapping of signals to ports may change responsive to a triggering event.

20 Claims, 9 Drawing Sheets

(56) References Cited

U.S. PATENT DOCUMENTS

| | | | |
|---|---|---|---|
| 2008/0244667 A1* | 10/2008 | Osborne | H04N 7/17318 |
| | | | 725/94 |
| 2008/0273452 A1 | 11/2008 | Khan et al. | |
| 2009/0103534 A1 | 4/2009 | Malledant et al. | |
| 2010/0317387 A1 | 12/2010 | O'Keeffe et al. | |
| 2011/0016499 A1 | 1/2011 | Liu et al. | |
| 2011/0085444 A1* | 4/2011 | Ko | H04L 43/026 |
| | | | 370/236 |

OTHER PUBLICATIONS

Jorge Salinger and John Leddy, "What is a CMAP?" Communications Technologies, Feb. 2010, pp. 20-25.
Jan. 3, 2018—Canadian Office Action—CA 2,724,920.

* cited by examiner

DYNAMIC ASSIGNMENT OF SIGNALS TO PORTS IN AN ACCESS PLATFORM

This application claims priority to U.S. Application Ser. No. 61/333,684, which was filed May 11, 2010.

FIELD OF DISCLOSURE

The disclosure is directed to methods and mechanisms for creating variable service group sizes and compositions in an access platform.

BACKGROUND

Access platforms typically allow users or receivers to receive signals from a network or to otherwise communicate with a network. In many networks, multiple users or receivers receive the same signal or set of signals. Such users may collectively be referred to as a service group.

Where a service group receives multiple signals, those signals are often combined for transmission additively. For example, two inputs, each carrying one signal, may enter a combiner. An output exits the combiner carrying both signals. Changing the signals carried on the output requires either physical rewiring of the combiner or changing the signal(s) carried on the inputs.

BRIEF SUMMARY

This summary is not intended to identify any critical or key elements. Instead, it merely presents certain introductory concepts. The full scope of this disclosure may be appreciated upon reading the full specification and figures, of which this summary is a part.

One or more ports may be configured to receive a plurality of signals as inputs. A plurality of ports may each be configured to output a plurality of channels. Each channel may contain a modulated signal received by the one or more ports as an input. A processing unit may be configured to forward the received signals to one or more ports. An external source may dictate the mapping of signals to ports. An external source may also dictate the channels on which the signals should be transmitted from each port. The mapping of signals to ports and/or channels may also be determined and/or modified by the processing unit.

The processing unit may forward any one signal to any number of output ports. Further, the processing unit may forward any one signal to any combination of output ports. Similarly, the output ports to which any one signal is forwarded does not necessarily restrict the output ports to which any other signal is forwarded. Some illustrative embodiments may restrict some or all of these features. For example, some illustrative embodiments may limit the number of output ports to which a signal may be forwarded.

Each output port may be associated with a plurality of modulators. Forwarding of signals to output ports may be accomplished by forwarding signals to modulators that are associated with the output ports. Individual modulators may be associated with only one output port, but individual modulators may also be associated with a plurality of output ports, and the output port(s) associated with any one modulator may be configurable.

The output port(s) to which a signal is forwarded may be changed responsive to a triggering event. The event may be receipt of a new mapping of signals to ports and/or channels. The event may also be receipt of a message. For example, a message that indicates whether a signal is or will be tuned to by a receiver may be used to change the mapping of signals to ports and/or channels. Another example of a triggering event is congestion, or lack thereof, on one or more data channels. Many other examples exist. The lineup of channels transmitted on a port may itself be transmitted from the port. If the mapping of signals to ports and/or channels changes, the transmitted lineup may change as well.

Other illustrative embodiments and variations will be apparent upon reading the detailed description set forth below. The disclosure is not intended to be limited in any way by this brief summary.

DETAILED DESCRIPTION

Figure 1:
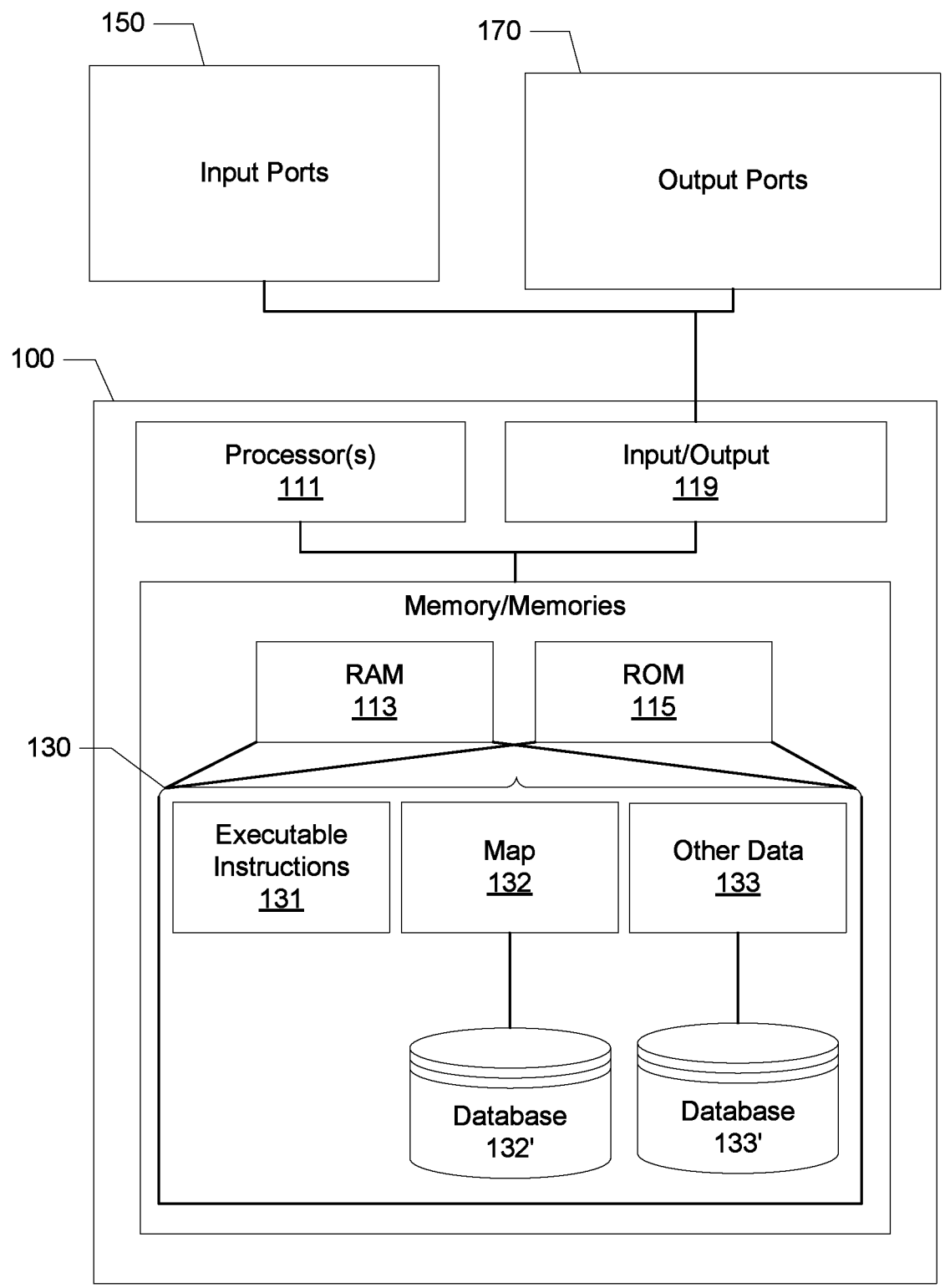
FIG. 1 illustrates an example of an access platform in accordance with some aspects of the disclosure.

FIG. 1 illustrates an example of an access platform. The access platform includes processing unit 100, input ports 150, and output ports 170. The signals sent and received from the input ports 150 and/or output ports 170 are communicated with the processing unit via input/output hardware 119. This hardware may include communications controllers, modulators, demodulators, and the like. While the input ports 150 and output ports 170 may be separate in many illustrative embodiments, it is also possible that a single port may function as both an input and an output. Similarly, the ports may be collocated, or they may be physically dispersed. The input/output hardware 119 may be connected to the input ports 150 and/or output ports 170 via coaxial cable, Ethernet cable, fiber optic cable, direct electrical connections, and/or other communication media including wireless communication media. The input/output hardware 119 may also include a variety of interface units and drives for reading, writing, displaying, and/or printing data or files.

The processing unit 100 includes one or more processor(s) 111, at least some of which control the overall behavior of the processing unit 100 by executing instructions 131, which may be stored in a memory 130. Memory 130 may include RAM 113, ROM 115, or other types of data storage, such as a sequentially accessed data storage medium. Memory 130 may store executable instructions 131, some of which may instruct the processing unit to forward signals received from input ports 150 to output ports 170 according to a map 132. Other executable instructions may instruct the processing unit to perform various other tasks. Memory 130 may also include various other data 133. Examples of other data include event logs, performance statistics, data for upstream or downstream distribution, received data, etc.

Map 132 and/or other data 133 may optionally be stored in a database format in database 132' and/or 133'. The database may be internal to processing unit 100, or it may be otherwise accessible to the processing unit 100. For example, the database may be stored in a remote location and/or in another device. Local copies of some or all of the databases may be stored by the memory 130 of the processing unit 100. In some illustrative embodiments, database 133' may include the database 132' (e.g., as a separate table, report, etc.). That is, the information can be stored in a single database, or separated into different logical, virtual, or physical databases, depending on system design. Those of skill in the art will appreciate that the functionality of the processing unit 100 may be spread across multiple processing devices, for example, to distribute processing load or to increase modularity. For example, some or all of the input/output hardware 119 may reside in a separate physical unit from some or all of the processor(s) 111 and/or some or all of the memories 130. In other words, the functional block division as shown in FIG. 1 may either correspond to or be independent of the physical implementation of the functional blocks.

One or more aspects of the disclosure may be embodied in computer-usable or readable data and/or executable instructions, such as in one or more program modules, executed by one or more processors or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium, such as a hard disk, optical disk, removable storage media, solid state memory, RAM, etc. As will be appreciated by one of skill in the art, the functionality of the program modules may be combined or distributed as desired in various illustrative embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of executable instructions and computer-usable data described herein.

Some illustrative embodiments may include a map, such as map 132, that indicates where one or more signals should be forwarded. The signals may be received from input ports 150, and they may be forwarded to one or more of output ports 170. Preferably, the signals are received in a digital form. Alternatively, the signals may be received in an analog format. Any received analog signals may be digitized. Examples of signals include data signals, such as signals used to transmit voice, video, and/or any other data traffic. Such signals may be transmitted according to any protocol. For example, DOC SIS standards, various wireless standards, fiber optic standards, etc. may be used. Such signals are usually, but not necessarily, narrowcast signals. Signals may also include or alternatively be broadcast, multicast, and/or narrowcast signals, including those associated with passive or interactive television content. Such signals may also be transmitted according to various video on demand or switched digital video standards, such as those found in the CableLabs Edge QAM Video Stream Interface Specification and the Comcast Next Generation On Demand Specifications, for example.

The output ports may transmit signals forwarded to from the input ports as well as other data, such as control or configuration data and/or additional signals. The processing unit may forward signals received from the input ports instantaneously. Alternatively, or in addition, the signals may be forwarded in a delayed fashion. This may be desirable for various technical reasons. Further, received signals may be stored and transmitted at a later time, such as in response to a request for the signal to be transmitted. An example of such a request is a request to begin a video-on-demand session.

The output ports may transmit data in a variety of forms. For example, the output ports may transmit data over an optical network, such as a passive optical network. In another example, the output ports may transmit data in radio-frequency channels. The radio frequency channels may be carried over a cable, such as a coaxial cable, or over any other medium. The radio frequency channels may be transmitted, for example, over the air.

Figure 2:
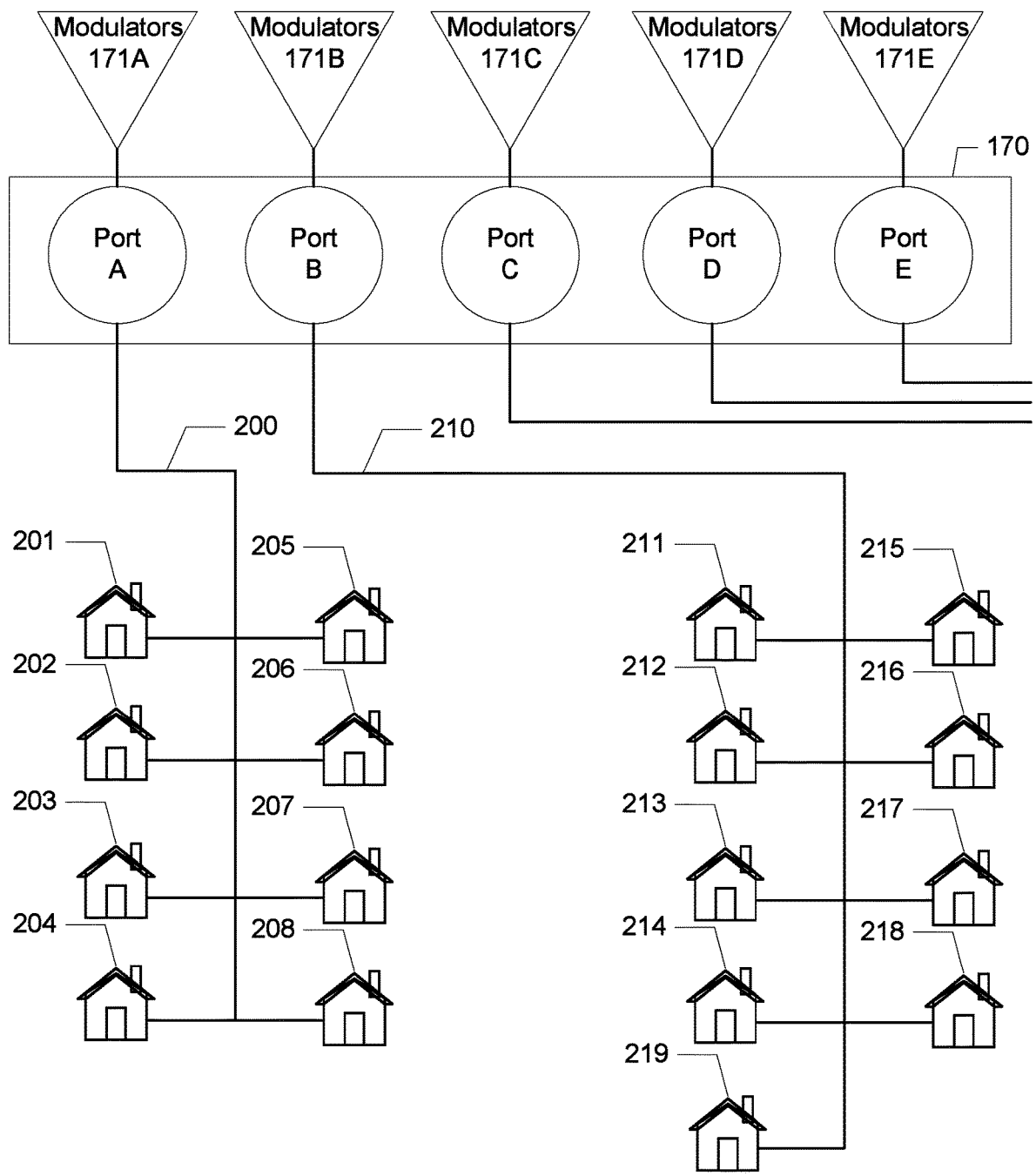
FIG. 2 illustrates an example of a distribution network that may be connected to the access platform in accordance with some aspects of the disclosure.

Each output port may correspond to a service group that receives the same services or signals. In a content provider network example implementation, a service group may be a group of receivers that all receive the same set of signals from the upstream central office (e.g., a headend). These receivers may share the same transmission link. As illustrated in the access network of FIG. 2, homes 201-208 each tap into transmission link 200 that is connected to port A of the output ports 170. Port A transmits the signals modulated by modulators 171A. Thus, homes 201-208 would constitute a service group because they each receive the same signals, which are transmitted on link 200. As seen in FIG. 2, homes 211-219 tap into transmission link 210, which is connected to port B of the output ports 170. Port B transmits the signals modulated by modulators 171B. Homes 211-219 constitute a distinct service group from homes 201-208 because each group may receive a different set of signals from one another. In a mobile (e.g., cellular) network example implementation, a service group is a group of receivers that may receive the same transmitted signal over the air, as opposed to receiving the signal over a physical link. Especially in the case of a mobile network, individual receivers may move into and out of a service group as their geographic location changes.

A modulator is often used to convert a signal into a suitable form for transmission. For example, it is common to modulate a signal for transmission over a radio frequency channel using quadrature amplitude modulation (QAM). In the case of cable systems, for example, 64-QAM and 256-QAM are commonly used. 64-QAM is commonly used on the highest-frequency channels of a coaxial cable system, where 256-QAM may encounter too many errors. Other modulation systems and networks may also be employed.

Figure 3:
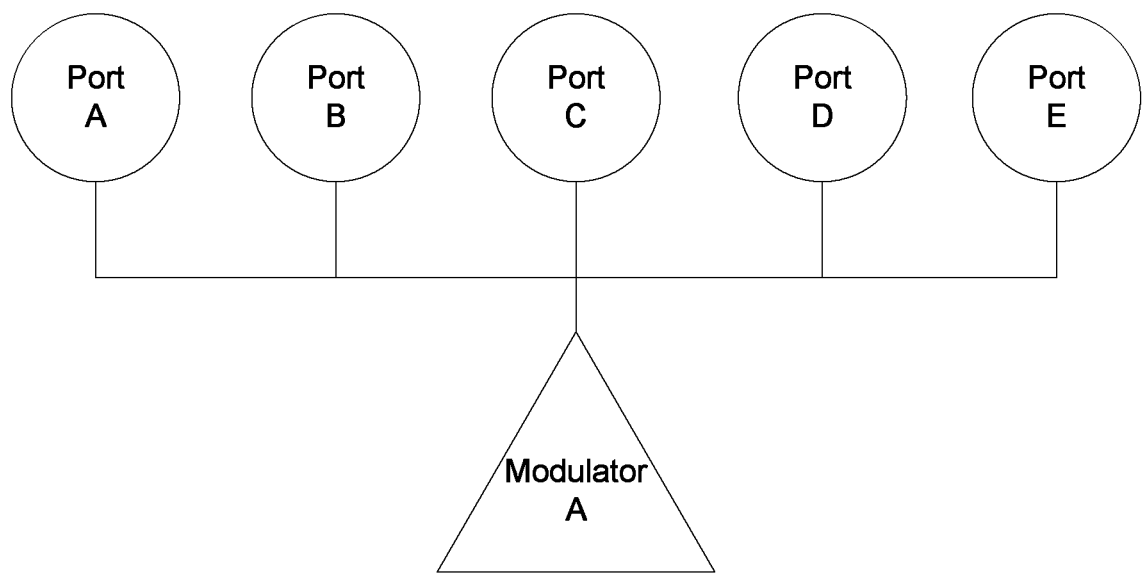
FIG. 3 illustrates a modulator in accordance with some aspects of the disclosure.

As depicted in FIG. 2, signals may be modulated prior to being transmitted from an output port. Individual modulators may be connected to output ports in a variety of different ways. FIG. 3 illustrates an example of how a modulator may be connected to the output ports. In this example, there are five output ports A-E. Of course, any other number of ports may be used. As shown in FIG. 3, a signal received and modulated by modulator A will be transmitted from ports A-E. In this example only one modulator is needed to forward a signal to all of the output ports, but the content on a channel output by modulator A would be the same for every port. In this example, the input to modulator A is typically called a broadcast signal because the input is transmitted to all of the output ports.

Figure 4:
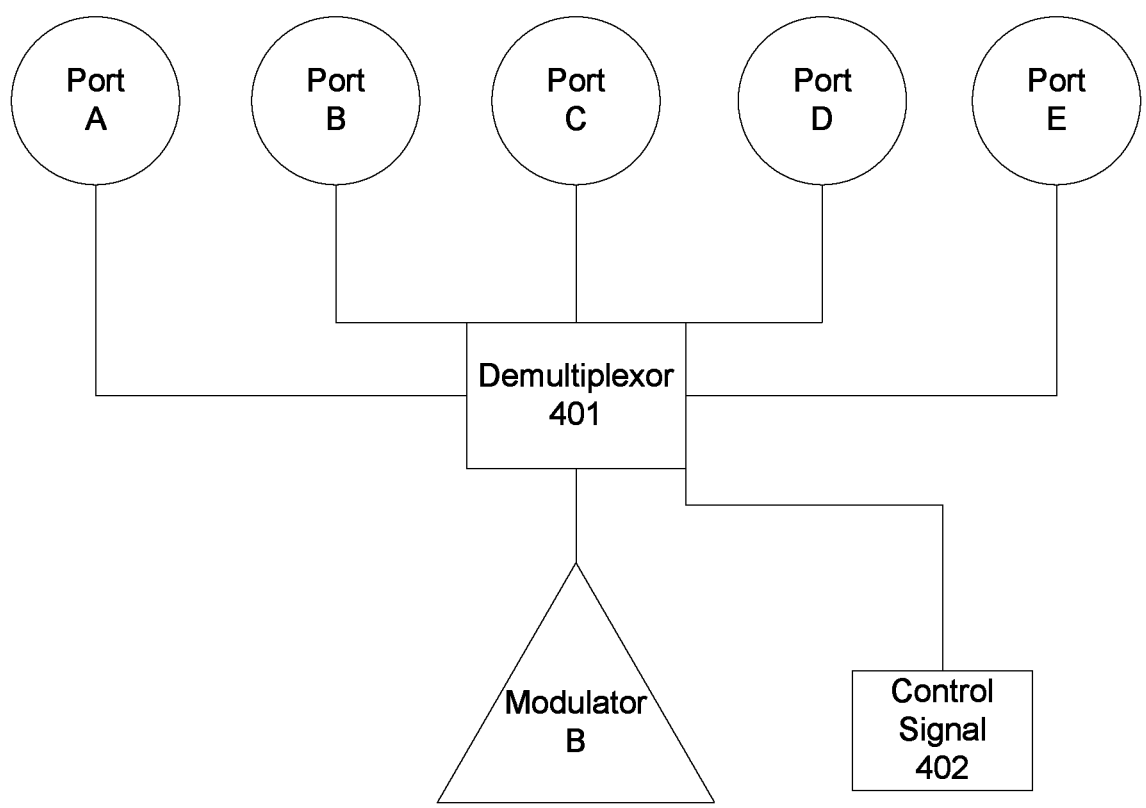
FIG. 4 illustrates another modulator in accordance with some aspects of the disclosure.

FIG. 4 illustrates an example of an alternative configuration for a modulator. In this example, modulator B may be connected to any combination of ports A-E, depending on the control signal 402 sent to demultiplexor 401. By adjusting the control signal (e.g. by a controller not shown, such as one of processor(s) 111), the output of modulator B may be passed to port A or blocked from port A. The same goes for each of the other ports. Thus, modulator B may transmit the received signal to all output ports, multicast the received signal to some but not all of the output ports, or narrowcast the received signal to only one output port. An appropriate control signal may also disconnect modulator B from all output ports.

Figure 5:
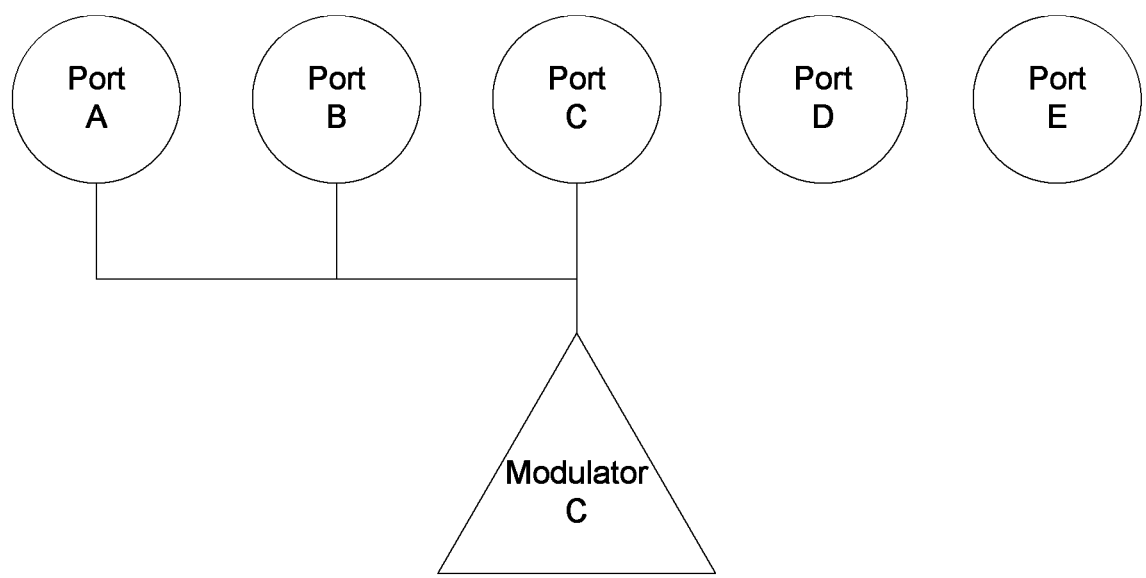
FIGS. 5-7 illustrate additional modulators in accordance with some aspects of the disclosure.

FIG. 5 illustrates an example of another configuration for the connection between a modulator and the output ports. In this example, modulator C is connected to output ports A-C, but not ports D-E. Thus, modulator C is connected to some, but not all, of the output ports, making it useful, for example, for multicast signals destined for output ports A-C.

Figure 6:
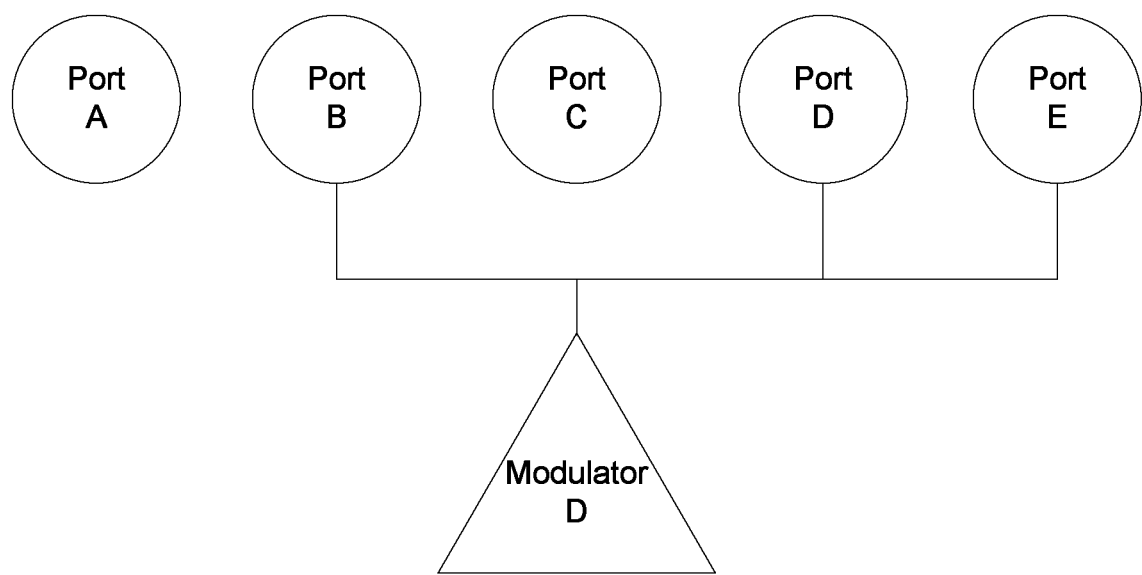
Figure 7:
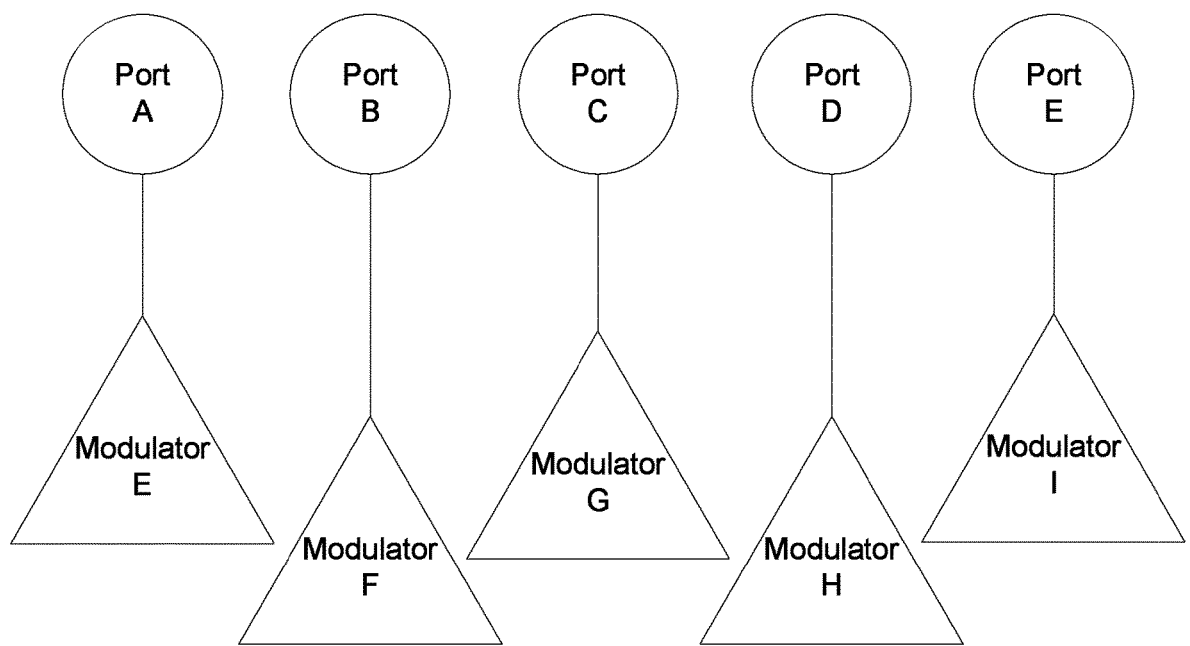

As seen in FIG. 6, modulator D is also connected to some, but not all, of the output ports. As illustrated in FIG. 6, the ports to which any one modulator is connected need not be contiguous. A modulator may be connected to any combination of the output ports. For instance, a modulator may be connected to only one output port. Modulators E-I, as shown in FIG. 7, are each examples of modulators connected to only one output port. Signals sent to only one output port may also be known as narrowcast signals. Modulators E-I may be useful for transmitting such signals. Modulators E-I may also be useful for transmitting other signals. For example, a multicast signal may be transmitted to multiple output ports by sending the multicast signal to multiple modulators that are each connected to only one output port.

A demultiplexor, such as the one shown in FIG. 4, may also be used with modulators that have physical connections to only some of the output ports, such as modulator C shown in FIG. 5. In this example, the demultiplexor would allow the output of modulator C to reach any combination of the ports A-C, depending on the control signal received by the demultiplexor. Although a physical demultiplexor is shown, the function of the demultiplexor, as with other aspects disclosed herein, may also be implemented in software.

The various ways of connecting modulators discussed above each have advantages and disadvantages. While the connection of FIG. 3 makes the most efficient use of the modulator, the other connection methods allow for more flexibility. For example, by forwarding the same input stream to two modulators that each serve a fraction of output ports, it is possible for the different output ports to transmit the same signal on different channels instead of on the same channel. Alternatively, a signal may be transmitted from a subset of the output ports, and not transmitted from the other output ports.

Any combination of the various modulator connections discussed above is possible. In some illustrative embodiments, 96 broadcast modulators (modulators connected to every output port) may be available, along with 32, 48, or 64 narrowcast modulators (modulators connected to only one output port) per output port. In other illustrative embodiments, every modulator may be a narrowcast modulator. In such illustrative embodiments, selecting modulators to use with a signal is straightforward. A narrowcast modulator for each destination port is selected. Even in cases where every modulator is a narrowcast modulator, it may be desirable to reserve a portion of those modulators for use with broadcast signals in some situations. For example, out of 160 total modulators per port, 96 modulators may be reserved for use with signals that are forwarded to every port, and the 64 remaining modulators may be available for use with signals that are sent to less than all of the ports.

Although thus far it has been disclosed that any received signal may, depending upon configuration, be sent to any modulator, it is also possible to configure the system such that some or all of the received signals may be sent to only certain modulators. Such a configuration may result from either hardware or software limitations. If modulators such as the one shown in FIG. 4 are used, then such configurations may not limit the ports to which any signal may be forwarded. In other examples, allowing a limitation on the ports to which some or all of the received signals may be forwarded may be desirable, such as where it provides simplicity and/or reduces cost.

It is possible for the output of a port to be combined with other signals. For instance, if the output ports output only digital channels, then analog channels may be combined with the output of the output ports. Other examples of signals that may be combined with the output of an output port include control signals used for maintenance or legacy out of band signals. Such signals may also be combined with the outputs of the modulators and included in the transmission from the output ports. Thus, in some illustrative embodiments each output port may be configured to output some or all of the digital channels for a service group. In some illustrative embodiments, each output port may also be configured to output some or all of the analog channels for a service group. In still further illustrative embodiments, control signals may also be included in the output of an output port.

A map, such as map 132, may specify which of the output ports 170 one or more signals should be forwarded to. In this case, the processing unit 100 will deliver the signals to the output ports 170 such that each output port contains the signals indicated by the map. The map may also specify the channel on which each signal should be modulated. Some modulators may be configured to output a modulated signal on a fixed channel. Other modulators may be able to output a modulated signal on a channel that is specified by a control signal.

Figure 8:
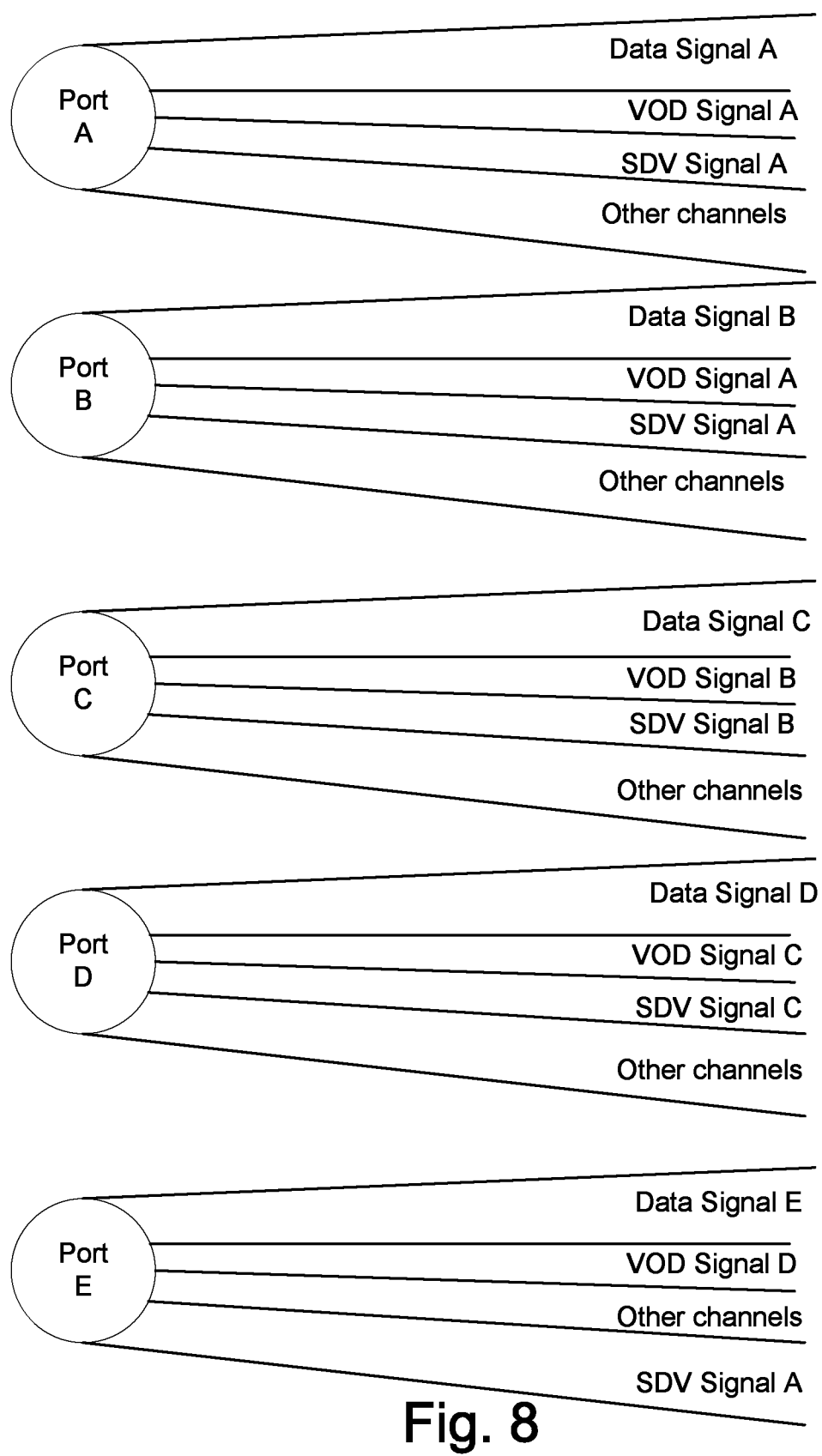
FIG. 8 illustrates one possible output of various output ports in accordance with some aspects of the disclosure.

FIG. 8 illustrates one possible mapping of signals to ports and channels. In this example, each port A-E receives a unique data signal (data signals A-E). But Ports A and B receive the same video on demand signal (VOD Signal A). Ports C-E receive different video on demand signals (VOD Signals B-D). Ports A, B, and E receive the same switched digital video signal (SDV Signal A), but ports C and E receive different switched digital video signals (SDV Signals B and C). SDV Signal A is transmitted on a different channel on port E than the channel used on ports A and B.

As this example illustrates, there is no requirement that the number of ports to which any one signal is sent corresponds to the number of ports to which any other signal is sent. Any signal may be sent to any number of ports on any number of channels. Similarly, there is no requirement that any one signal be transmitted on the same channel when that signal is being transmitted over multiple ports. Different channels may be used on every port for every signal. An individual signal may even be transmitted to the same port more than once by transmitting it on more than one channel.

Conversely, in some cases multiple signals may be transmitted on the same channel by using various signal combining techniques, such as time division, code division, etc. Although not required generally, it may be desirable or necessary to constrain the mapping of input signals to output ports and channels in some illustrative embodiments. Examples of such illustrative embodiments include embodiments with physical limitations, such as a limited numbers and/or types of modulators, processing capacity, or other constraints.

The map 132 may specify which modulator each signal should be delivered to. In illustrative embodiments where each port/channel combination corresponds to a unique modulator, merely specifying ports and channels on which to output a signal accomplishes this feature. In other illustrative embodiments, information in addition to the port and channel may be required to uniquely identify a modulator. In the case where the modulators have selectable outputs, such as the example shown in FIG. 4, the map 132 may also specify which control signal demultiplexor 401 should receive. Further, if the modulators can be configured to output a modulated signal on a specified channel, the map 132 may specify the channel to set some or all of the modulators to.

The processing unit 100 may be configured to comply with the map 132. In the event the map 132 does not provide all of the previously mentioned details, processing unit 100 will create the details itself in order to comply with the map 132. For example, if the map 132 does not specify enough information to uniquely determine which modulators to forward a signal to, the processing unit 100 may forward the signal to appropriate modulators determined by the processing unit itself. In the event the modulators have selectable outputs, those outputs will be set to the appropriate ports.

Map 132 may be a file or files or a database entry or entries that explicitly link signals to output ports and/or channels, as discussed above. However, the mapping of signals to ports, as well as the other information identified above, need not be stored in a single location or kept in a single place. For example, the processing unit may be aware of the port and/or channel to which it is currently forwarding each received signal. This information alone maps the signals to the ports, even though this status information may be kept in various, disparate areas of memory. Further, the information may be kept only in the modulators themselves or in other places that may be considered separate from memory 130. The mapping of signals to ports may be stored in any form and it may be read from any location or locations.

Figure 9:
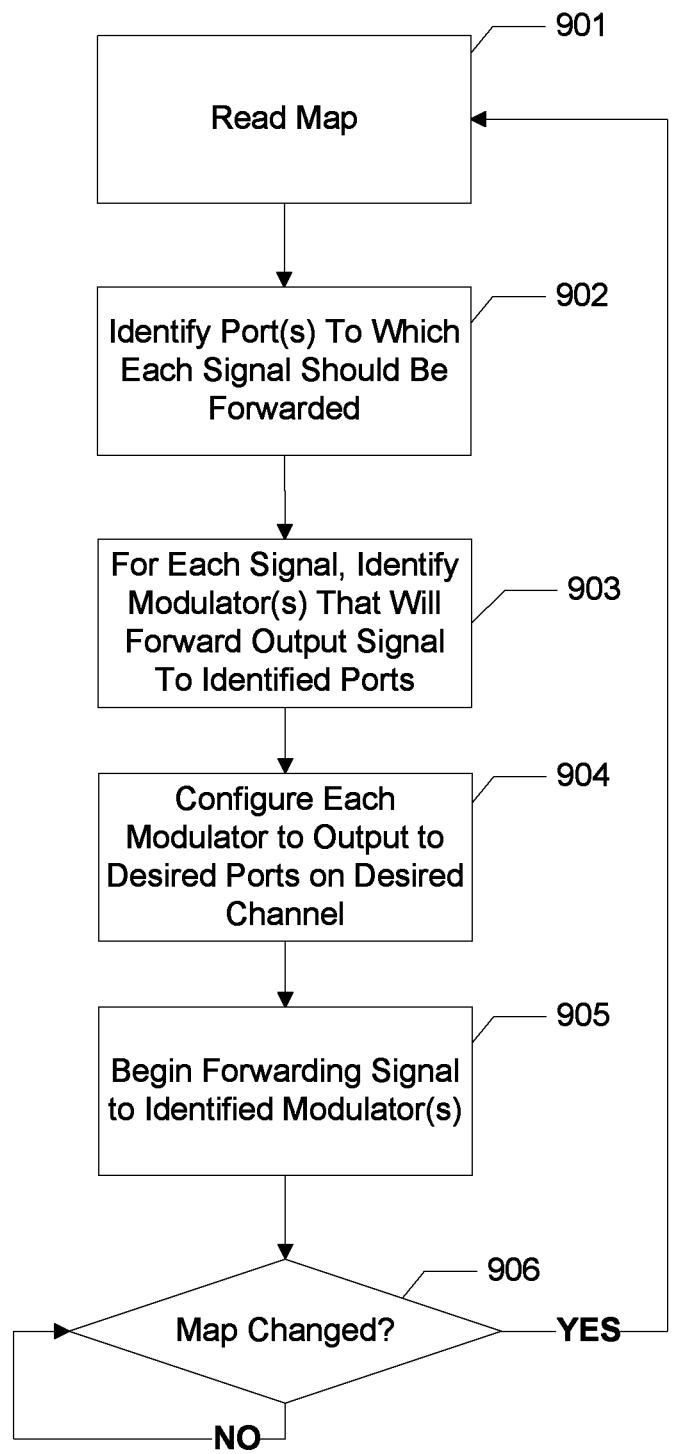
FIG. 9 shows an illustrative method of forwarding a signal to a set of ports in accordance with some aspects of the disclosure.

FIG. 9 shows a method of forwarding a signal to a set of ports according to a map. In step 901, the map is read. In step 902, the port(s) to which each signal should be forwarded are identified from the map. For example, a broadcast signal is forwarded to all of the ports. A multicast signal may be forwarded to only a subset of the ports. A narrowcast signal may be forwarded to only one port.

In step 903, the modulator(s) that will forward their output signal to the ports are identified. They may be identified from data contained in the map itself. If the map does not provide enough information to uniquely identify the modulator(s) to be used, then the processing unit may select modulator(s) to use. Examples of how the processing unit may select which modulator(s) to use are discussed below. In the case where each port contains only narrowcast modulators, step 903 may be completed by selecting, for each of the ports the signal will be forwarded to, a modulator that will output on the desired channel. In cases where the modulator that is selected does not matter, such as where there is no desired channel or where the modulator can be set to any channel, this step may be duplicative of step 902.

In step 904 the identified modulators are configured to output their output signal to the desired ports on a desired channel. Step 904 may be implemented, for example, where the ports to which the modulated output is sent can be changed by a control signal, as illustrated in FIG. 4. It may also be implemented where the channel on which the modulator outputs its signal can be controlled. This step may not be required where, for example, the modulators need no configuration.

In step 905, the signals identified in the map are forwarded to the modulators identified in step 903. The output ports thereby receive the signals indicated by the map.

In step 906, the processing unit checks whether the map has changed. If the map has not changed, then nothing needs to be done. If it has changed, then the process may be repeated in order to ensure that the output ports contain the signals specified by the map. The processing unit may perform step 906 with or without iteratively testing the contents or metadata associated with the map. For example, the processing unit may be alerted to changes in the map by receiving a specified signal or by an event handler being triggered. In such configurations, the absence of the signal or event may constitute an indication that the map has not changed. A combination of these techniques may also be used. For example, the processing unit may respond to a signal or event, but it may also periodically re-read the map and either check for changes or simply repeat the setup process starting with step 901 regardless of the map's contents.

As noted previously, the mapping of signals to output ports and/or channels may be stored in any form and may be read from any location or locations. It will be understood that the above method may differ depending on how the mapping of signals to output ports and/or channels is stored and depending on other implementation details. It may also differ depending on what changes to the current mapping are required. For example, the method of FIG. 9 may repeat upon any event that triggers a change in the mapping of signals to output ports and/or channels. Another example is that step 901 may be performed only partially or it may be eliminated entirely. For instance, when the mapping of a group of signals is modified, the modification can often be completed without consulting the mapping for the rest of the signals. Where only a new signal is being added to the output, the mapping for the existing signals may not need to be consulted at all.

Where the information in the map is insufficient to uniquely identify which modulators should be used to modulate a received signal, a different methods may be implemented for automatically determining which modulators to use. Such methods may vary depending on the configuration of the modulators in any particular processing unit. In some systems, such as systems with only broadcast modulators and narrowcast modulators that are each dedicated to a particular output port, the mapping of signals to modulators may be less complex. In this example, broadcast signals may go to the first available broadcast modulator, or, alternatively, to the broadcast modulator for the appropriate channel (where a channel on which to output the signal has been specified). Multicast and narrowcast signals would similarly go to the modulator(s) for each output port. Again, either the first available modulator or the modulator for the appropriate channel may be used.

This same methodology may be used in the case where all of the modulators are narrowcast modulators that are each dedicated to a particular output port: each signal goes to the first available modulator of the port or to the modulator of the port for the appropriate channel. Illustrative embodiments in which each port has its own dedicated modulators allow those modulators to be thought of as part of the ports themselves. Thus, the signals may be forwarded to the input(s) of one or more output ports. The inputs to each output port are then modulated and output. The input may be modulated on channel(s) specified by the map or on arbitrary channel(s). Arbitrary channels may be used if channels are not specified by the map. When conceiving of the modulators as part of each port, each of the below-described methods of forwarding a signal to a modulator may still apply.

Figure 10:
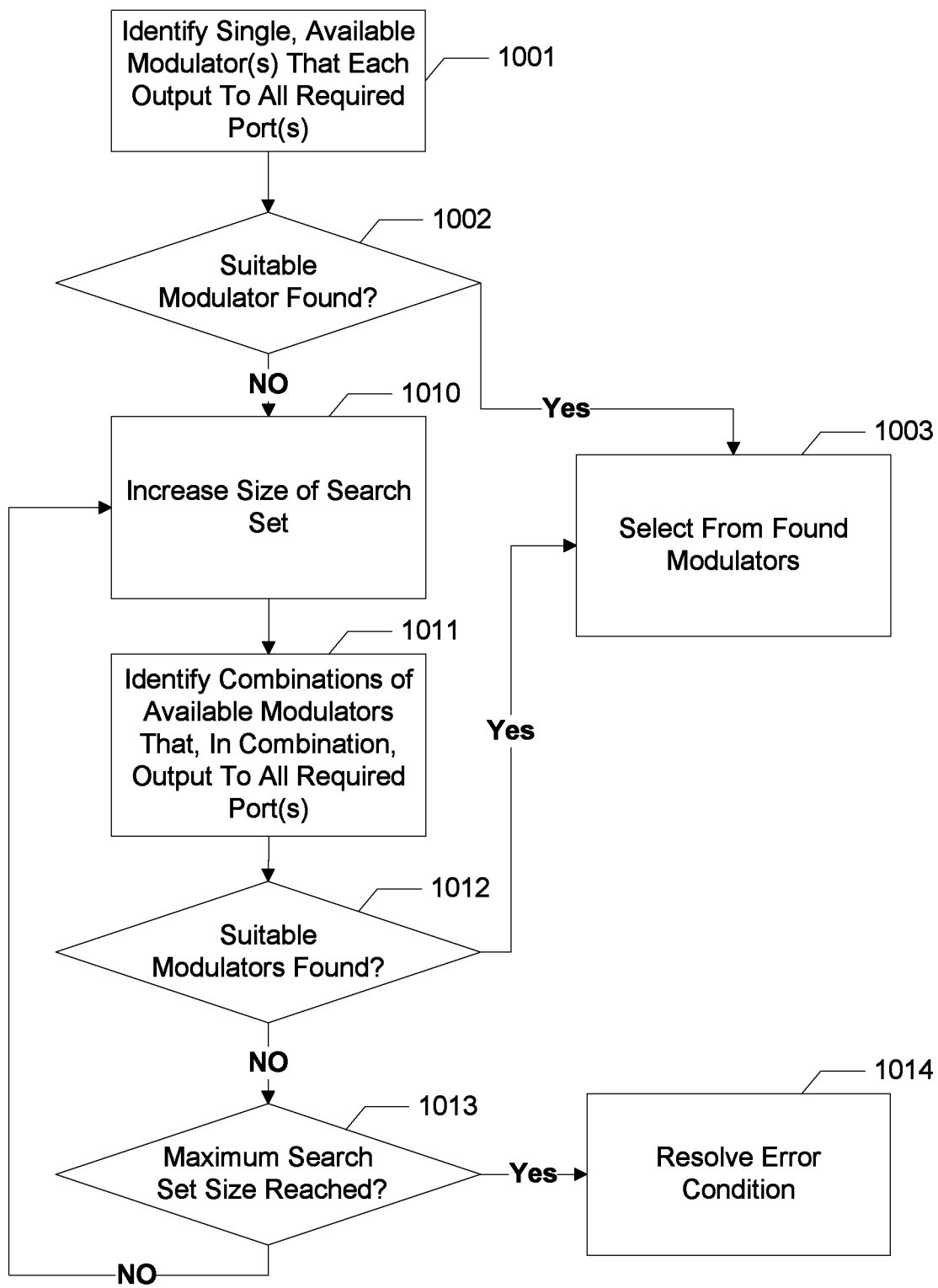
FIG. 10 shows an illustrative method of identifying modulators in accordance with some aspects of the disclosure.

An additional method of coordinating, or assigning, signals to modulators is shown in FIG. 10. The method shown in FIG. 10 may be repeated once for each signal. The signals may be processed according to this method in a particular order. This order may be, for example, the order in which the signals appear in the map, or the order may be otherwise dictated by the map. The order may also be determined according to other factors. For example, the signals may be assigned to modulators in the order of the number of output ports that they will be sent to, or in the reverse of that order. Alternatively, the signals may be assigned to modulators in the order of the number of modulators that will be required to send the required output to the indicated set of ports. As one of ordinary skill in the art would understand, the algorithm shown in FIG. 10 may need modification depending on which ordering technique is used.

In the example shown in FIG. 10, the process begins at step 1001, when the processing unit identifies whether a single, available modulator's output would reach all of the required output ports. A modulator may be considered unavailable if it is already being used to modulate another signal, for example. This could occur because another signal was processed and assigned to the modulator before the signal currently being assigned. Alternatively, some mapping updates may include one or more simple instructions, such as unmapping a particular signal, changing the output ports of a particular signal, or mapping a new, additional signal. In this case, a modulator may be unavailable because it is already in use by signals that are not being changed in this map update. In the example where an output channel is specified, a modulator may also be unavailable because it cannot output on the specified channel.

If at least one single modulator was found that is capable of sending its output to all of the required ports, then a decision at step 1002 indicates that one of those modulators may be selected for use in step 1003. In some situations, it may be desirable to allow a signal to be forwarded to a modulator whose output will reach more ports than are specified in the map. This may be desirable in cases where, for example, there may be unused broadcast modulators, but where narrowcast modulators are in demand. By using a broadcast modulator to send a multicast or narrowcast signal, additional multicast or narrowcast modulators may be made available. In some cases, the processing unit may transmit the channel lineup of each port. If a multicast or narrowcast signal is sent using a broadcast modulator, it may be desirable to alter the channel lineup so that the multicast or narrowcast signal is not included in the transmitted channel lineup of the ports that were not required to receive the multicast or narrowcast signal. In other situations, it may be desirable or required to follow the mapping of signals to ports exactly. This may be desirable, for example, if all or nearly all channels of any one output port are in use. In such a situation, adding additional signals may unnecessarily crowd or overload that port. In such a situation, a modulator may be considered to output to the required output ports only if its outputs reach the required output ports, but not any additional ports.

If no single modulators were found, then a decision at step 1002 indicates that the process may proceed to step 1010. Again, even if a modulator is capable of transmitting to each output port, it may be considered unsuitable for other reasons, and therefore the process may still proceed to step 1010 instead of step 1003 after the decision at step 1002. For instance, if a modulator is incapable of transmitting on a particular channel, then it may be unsuitable if the stream being assigned is to be sent on such a channel.

Having found no suitable modulators in the previous search, step 1010 increases the size of the search set. It may make sense to increase the size of the search set by only one modulator. If the previous search set size was one modulator, as it was in step 1001, then this would bring the size of the search set to two modulators. In the example where the search set size is increased to two modulators, the system would identify sets of up to two modulators that, in combination, output to all of the required output ports in step 1011. The size of the search set may increase by any amount. For example, if a system uses only broadcast and narrowcast modulators, it may make sense to increase the size of the search set by the number of ports on which the signal will be output because this would allow sets consisting of only narrowcast modulators to be considered in step 1011. A decision at step 1012 may indicate that if a suitable combination of modulators is found, then one such combination will be selected in step 1003.

If only one combination of modulators is found in steps 1001 or 1011, then step 1003 may be duplicative of these earlier steps. This may be the case even if more than one set of suitable modulators is available because steps 1001 and/or 1011 may, in one implementation, stop searching once one set of suitable modulator(s) has been identified. As discussed above, a combination may be considered unsuitable for various reasons even if the identified modulators could transmit to the required output ports.

If no suitable combinations of modulators are found, then the size of the search set may increase again as the process returns to step 1010. However, if the search set has already reached its maximum size, an error condition may have to be resolved in step 1014. If the maximum search set size is set appropriately, such as a quantity equivalent to the numbers of available modulators or the number of ports being forwarded to, then the failure to identify a suitable set of modulators may indicate an error in the map, such as an attempt to output signals on channels in a way that exceeds the capacity of the system. In such a case, the erroneous map may be ignored or only partially followed. However, reaching step 1014 may also indicate that certain additional steps may need to be taken to reach an appropriate mapping of signals to modulators. For example, some already-allocated signals may need to be remapped to different modulators. For instance, if modulators are limited, a multicast signal may need to be remapped to a broadcast modulator in order to follow the map. If channel space is limited, such a mapping may need to be removed. The steps required to resolve such an error may depend on the assumptions used by the system. In any case, the system may allocate the signals to the modulators such that the most efficient use of the system's resources is made. It may be desirable to do this in all cases instead of only when an error condition arises.

In some cases, the map may be updated by the processing unit itself instead of relying on an external source to provide updates to the map. For instance, in the case of video-on-demand or switched digital video signals, the processing unit may receive a request to begin transmitting a signal to a port when a user tunes to a channel or requests that a video begin. Conversely, the processing unit may receive an indication of when a video-on-demand or switched digital video transmission is no longer needed on a particular port. In the case of switched digital video, such an indication may be when no users receiving the output of a particular port are still watching the channel. The processing unit may keep a count of the number of users that are tuned to a switched digital video channel in order to determine when the number of users reaches zero and the channel is no longer needed on a particular port.

In the case of a new signal, such as a video on demand signal that needs to be transmitted from a particular port, the processing unit may update the map to include the new signal and port. In the case of a switched digital video signal, the signal may already exist on the map. In that case, only the ports to which the signal is sent need to be updated, depending on the format of the map. In either case, the signal may then be sent to the appropriate ports in accordance with the updated map. The processing unit may transmit the new channel lineup of the output ports so that users are able to locate the requested video signals. The channel lineup information may also be transmitted periodically or in response to other requests. The channel lineup may include all of the channels transmitted on an output port, but it may also include only a portion of those channels. For instance, it may be desirable to transmit the channels used for a switched digital video signal, but not the channels used for other types of signals or the channels whose content does not or has not changed.

Conversely, when a signal is no longer needed on an output port, the processing unit may remove that signal-to-port entry from the map. The processing unit may again transmit the new channel lineup of the output ports to some or all of the output ports when the update takes place. A variety of triggering events may cause the processing unit to update the map, not just the examples discussed above. Further examples of events that may trigger a change in channel lineup of an output port include reliability considerations, such as that certain channels may have less reliable transmission. In this example, the less reliable channels may be avoided unless all other channels or certain other channels are already in use. Similarly, congestion on a data channel may be used to allocate additional data channels, and a lack of congestion may be used to deallocate data channels. Equipment reliability considerations may also trigger a change. For instance, if a modulator fails, then the input-to-output mapping could change in order to avoid that modulator without disrupting service. The mapping may be changed to avoid certain modulators for other reasons as well, such as a measured heat buildup. Similarly, transmission on certain channels may require more power or be more efficient than transmission on other channels. Thus modulators for certain channels may be avoided or used only when other channels are already in use.

Further, a triggering event, including the examples discussed above, may cause another component other than the processing unit to update the map. Such other components may also work in conjunction with the processing unit to establish the new mapping of signals to output ports.

The process of forwarding a received signal to a modulator may be achieved in a variety of different ways. For example, the port that receives the signal for forwarding may be directly connected to one or more modulators via a cable, wire, or other link. In the case where multiple ports, such as input ports 150, are connected to one or more modulators, multiplexors may be used to connect each input to only the appropriate modulators, and to ensure that each modulator receives the correct number of inputs (usually one or zero, unless the modulator can accept multiple inputs). As mentioned previously, combined signals may sometimes be forwarded to a modulator using time division techniques, code division techniques, etc.

Figure 11:
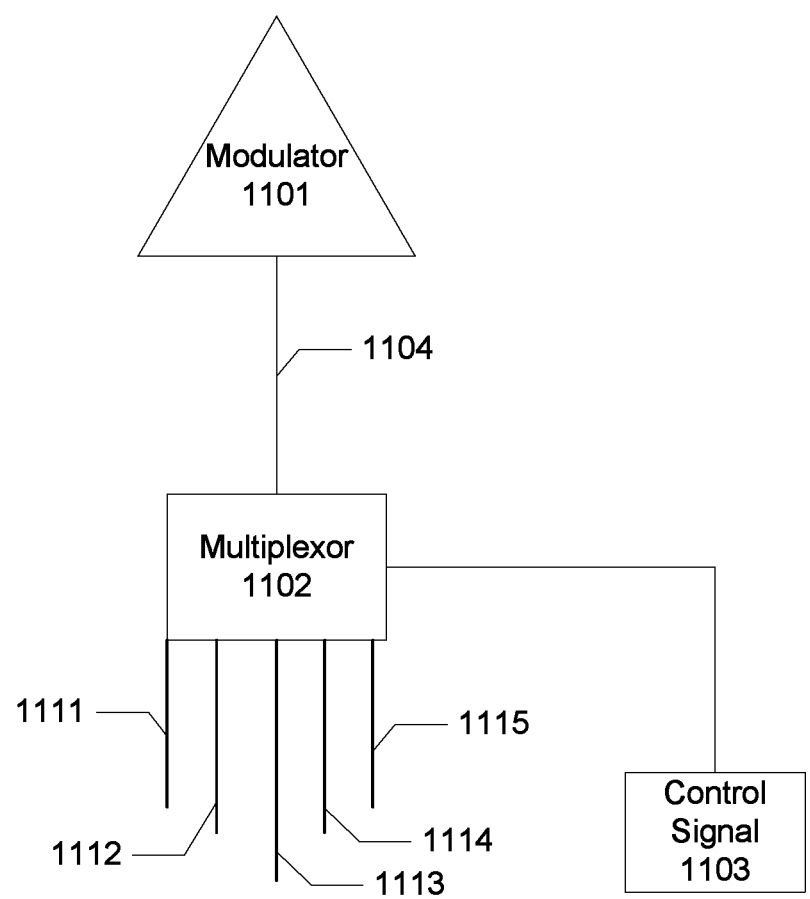
FIG. 11 shows an illustrative multiplexor in accordance with some aspects of the disclosure.

In the example of FIG. 11, signals 1111-1115 are each received by multiplexor 1102. Control signal 1103 controls which of signals 1111-1115 reach modulator 1101 via connection 1104. Modulator 1101 may be any of the modulators described herein.

The physical multiplexor illustrated in FIG. 11 is not required. One or more processors may place a copy of a received signal on a link, wire, or wires destined for a multiplexor instead. This may be accomplished using dedicated hardware or by using a data bus. While the modulator may passively receive information, it is also possible to configure the modulator to actively receive the signal to be modulated. For example, the modulator may encode a signal found in a certain memory location. The input to the modulator may be controlled by copying different input signals to that memory location. Alternatively, the modulator may be instructed to read from a different memory location depending on which signal it is to modulate. Of course, many more variations are also possible.

While the disclosure has been presented with respect to some specific examples including presently preferred modes, those skilled in the art will appreciate that there are numerous variations and permutations of the above described systems and techniques that fall within the spirit and scope of the invention as set forth in the appended claims.

What is claimed is:

1. A method comprising:
    based on a mapping of signals to ports, outputting, by a computing device, the signals via the ports, wherein the ports comprise a first set of ports, and wherein one of the signals comprises a first signal that is mapped to each port in the first set of ports;
    receiving, by the computing device and from at least one network device, a signal indicator; and
    causing, based on the signal indicator, an update of the mapping.

2. The method of claim 1, wherein at least one of the ports is associated with a plurality of network devices, wherein the mapping associates a modulator with the first set of ports; and
    wherein the outputting comprises outputting, from the modulator and via the first set of ports, a subset of the signals.

3. The method of claim 2, wherein the outputting further comprises outputting the subset of the signals, via the first set of ports, to the plurality of network devices.

4. The method of claim 1, wherein the signal indicator comprises user preferences, the method further comprising:
    receiving, by the at least one network device, an indication of the user preferences, wherein the user preferences are associated with multimedia content; and
    wherein the causing the update of the mapping comprises causing, based on the user preferences, a signal associated with the multimedia content to be either added to the mapping or removed from the mapping.

5. The method of claim 1, wherein the mapping associates a single modulator with each of the ports, and wherein outputting the signals via the ports comprises outputting the signals, from the single modulator, via the ports.

6. The method of claim 1, wherein the first set of ports is associated with a service group, wherein one of the signals comprises a signal associated with multimedia content, and wherein outputting the signals comprises outputting, to each member of the service group and via the first set of ports, the signal associated with the multimedia content.

7. The method of claim 6, wherein the signal indicator comprises an indication that viewership of the multimedia content does not satisfy a threshold; and
wherein the causing the update of the mapping comprises causing the signal associated with the multimedia content to be removed from the mapping.

8. The method of claim 1, wherein the ports further comprise a second set of ports, and wherein the signal indicator comprises an indication of data congestion associated with the first set of ports; and
wherein the causing the update of the mapping comprises re-mapping, based on the indication of data congestion, a subset of the signals from the first set of ports to the second set of ports.

9. The method of claim 1, further comprising:
outputting, based on the update of the mapping, the signals via the ports.

10. A method comprising:
determining, by a computing device and based on a mapping of signals to sets of output ports that comprise a first set of multiple output ports and a second set of multiple output ports, a first modulator associated with the first set of multiple output ports and a second modulator associated with the second set of multiple output ports;
forwarding a first signal to the determined first modulator to generate a first modulated signal and a second signal to the determined second modulator to generate a second modulated signal; and
outputting, based on the mapping, the first modulated signal via the first set of multiple output ports and the second modulated signal via the second set of multiple output ports.

11. The method of claim 10, wherein the first modulated signal comprises switched digital video.

12. The method of claim 10, wherein the first signal comprises video content, and wherein a first output port of the first set of multiple output ports is associated with a plurality of user devices, the method further comprising:
receiving, from at least one user device of the plurality of user devices, an indication that viewership for the video content does not satisfy a threshold; and
causing an update of the mapping to remove the first signal from the mapping.

13. The method of claim 10, further comprising:
receiving, from at least one user device, at least one request for content associated with a third signal; and
updating, based on the receiving, the mapping to include the third signal and an associated set of output ports.

14. The method of claim 13, further comprising:
outputting, based on the updating the mapping, the third signal via the associated set of output ports.

15. The method of claim 10 further comprising:
removing, based on an indication that operability of a network device associated with the second set of multiple output ports does not satisfy a threshold, the second set of multiple output ports from the mapping; and
re-mapping the second modulated signal to a third set of multiple output ports.

16. A method comprising:
causing, by a computing device and based on a mapping of signals to output ports, transmission of a first set of the signals to a plurality of network devices via a plurality of the output ports;
generating, by the computing device, an updated mapping after receiving an indication of user preferences;
causing, based on the updated mapping, transmission of a second set of the signals via the plurality of the output ports;
wherein the mapping associates a first modulator with a first subset of multiple output ports of the plurality of the output ports and associates a second modulator with a second subset of multiple output ports of the plurality of the output ports; and
wherein at least one signal of the first set of the signals is mapped to each of the output ports of the first subset of multiple output ports and at least one signal of the second set of the signals is mapped to each of the output ports of the second subset of multiple output ports.

17. The method of claim 16, wherein the causing transmission of the first set of the signals to the plurality of network devices via the plurality of the output ports comprises transmitting, from the first modulator and the second modulator, the first set of the signals.

18. The method of claim 16, wherein the indication of user preferences is received from at least one network device of the plurality of network devices.

19. The method of claim 16, wherein the generating the updated mapping after the receiving the indication of user preferences comprises:
receiving an indication that viewership for a video content associated with one of the signals does not satisfy a threshold; and
removing, based on the indication that the viewership for the video content associated with the one of the signals does not satisfy the threshold, the one of the signals from the mapping.

20. The method of claim 16, wherein at least one output port of the output ports is configured to output a plurality of channels, and wherein the mapping of signals and the updated mapping comprise channel information that specifies, for each of the signals, an output port of the output ports and a channel of the plurality of channels on which to transmit the signal.

* * * * *

UNITED STATES PATENT AND TRADEMARK OFFICE
CERTIFICATE OF CORRECTION

PATENT NO. : 10,652,095 B2
APPLICATION NO. : 15/049973
DATED : May 12, 2020
INVENTOR(S) : Jorge Salinger Page 1 of 1

It is certified that error appears in the above-identified patent and that said Letters Patent is hereby corrected as shown below:

In the Specification

Detailed Description, Column 3, Line 64:
Please delete "DOC SIS" and insert --DOCSIS--.

Signed and Sealed this
Twenty-fourth Day of November, 2020

Andrei Iancu
*Director of the United States Patent and Trademark Office*